United States Patent [19]

Miyake

[11] Patent Number: 4,905,090
[45] Date of Patent: Feb. 27, 1990

[54] READING OR WRITING METHOD AND APPARATUS THEREOF

[75] Inventor: Hideyuki Miyake, Kyoto, Japan

[73] Assignee: Sharp Kabushiki Kaisha, Osaka, Japan

[21] Appl. No.: 250,410

[22] Filed: Sep. 28, 1988

[30] Foreign Application Priority Data

Sep. 30, 1987 [JP] Japan .................................. 62-247629

[51] Int. Cl.$^4$ ......................... H04N 1/04; H04N 1/17; H04N 1/23
[52] U.S. Cl. .................................... 358/296; 358/472; 358/496; 358/476
[58] Field of Search ................ 358/296, 293, 288, 285

[56] References Cited

U.S. PATENT DOCUMENTS 4,099,208  7/1978  Tasaku .................................. 358/296

Primary Examiner—Clifford C. Shaw
Assistant Examiner—Scott A. Rogers
Attorney, Agent, or Firm—Birch, Stewart, Kolasch & Birch

[57] ABSTRACT

The present invention provides a reading or writing method and apparatus thereof for reading data on a medium or writing data thereon by reciprocatively driving a reading/writing head over the medium. The method comprises driving the head forward at a predetermined speed at all times, and returning the head at a predetermined maximum speed when the reading or writing length is at a maximum, or at a speed lower than the maximum speed when the reading or writing length is shorter than the maximum so as to complete the reciprocation of the head within the same period as when the reading or writing length is the maximum.

12 Claims, 3 Drawing Sheets

READING OR WRITING METHOD AND APPARATUS THEREOF

BACKGROUND OF THE INVENTION

1. Field of the Invention

The present invention relates to a reading or writing method and apparatus thereof, and more particularly to a method and an apparatus for reading or writing data by driving a reading/writing head, for example, for use in a serial type of facsimile system.

2. Description of the Prior Art

With a serial-type facsimile apparatus, a movable unit serving as a reading/writing head has a unidimensional solid-state image sensor and a heating element for thermal recording which are arranged according to the direction of transport of documents and recording paper. The movable unit performs a reading or writing operation while traveling in a direction perpendicular to the transport direction (see, for example, U.S. Pat. No. 4,564,847 and Unexamined Japanese Patent Publication No. SHO-59-228462).

Accordingly, the serial-type facsimile apparatus has the advantage of being inexpensive to manufacture since there is no need to use expensive electronic parts such as a line sensor extending over the entire width of documents and a heating element extending over the entire width of the recording paper.

However, the movable unit, which is mechanically driven, gives off mechanical noise. Especially in a direction opposite to the reading or writing direction, the movable unit is driven at a high speed, so that mechanical noise during travel and impact noise upon stopping are considered to be a nuisance.

On the recommendation of CCITT (The International Telegraph and Telephone Consultative Committee), a limitation has been imposed on the communication time per line of the facsimile system, whereby the scanning time per stroke of the movable unit is limited. Accordingly, during the return travel (without reading or writing), the movable unit is driven at a particular speed depending on the maximum size of documents being used.

FIG. 4 is a diagram showing the relationship between the speed of travel of the movable unit and time of the reading operation of a conventional facsimile apparatus.

The speed of the movable unit for a document of large size is indicated in the phantom line. For this document, the movable unit starts to travel from a reference position at the start of a period T5, reads the document while traveling over the period T5 and stops on traveling the dimension of the document. The unit is thereafter returned to the reference position over a period of T8.

The speed of the movable unit for a document of small size is represented by a solid line. The unit starts to travel from the reference position with the start of a period T6, reads the document while traveling over the period T6 and stops upon traveling the dimension of the document. The unit thereafter returns to the reference position over a period of T7. When returning to the reference position, the unit travels at a particular speed regardless of the size of documents.

Conventional serial-type facsimile apparatus are generally adapted for use with documents ranging in width from A5 size (148 mm) to A3 size (297 mm). While the documents actually used have varying sizes, documents of maximum size are used rather infrequently. However, even if documents of small size are used, the head is returned at a particular high speed at all times as already stated, consequently producing the same noise as when documents of maximum size are processed.

SUMMARY OF THE INVENTION

The present invention provides a reading or writing method for reading data on a medium or writing data thereon by reciprocatively driving a reading/writing head over the medium, the method comprising driving the head forward at a predermined speed at all times, and returning the head at a predetermined maximum speed when the reading or writing length is a maximum, or at a speed lower than the maximum speed when the reading or writing length is shorter than the maximum so as to complete the reciprocation of the head within the same period as when the reading or writing length is maximum.

The present invention further provides a reading/writing apparatus including:

transport device for transporting a medium in one direction, a head for reading data from the medium or writing data thereon, head drive device for reciprocatively driving the head over the medium perpendicular to the direction of transport of the medium, communication device for sending out the data read by the head and receiving from outside the data to be written on the medium to feed the data to the head, sensor device for detecting the size of the medium, device for judging the length of reading or writing by the head from the medium size detected by the sensor device, or from the data received by the communication device, and control device for controlling the transport device and the head drive device in synchronism to drive the head forward at a predetermined speed at all times and to return the head at a predetermined maximum speed when the reading or writing length determined by the judging device is at a maximum, or at a speed lower than the maximum speed when the reading or writing length is shorter than the maximum so as to complete the reciprocation of the head within the same period as when the reading or writing length is maximum.

DESCRIPTION OF THE PREFERRED EMBODIMENTS

Figure 1:
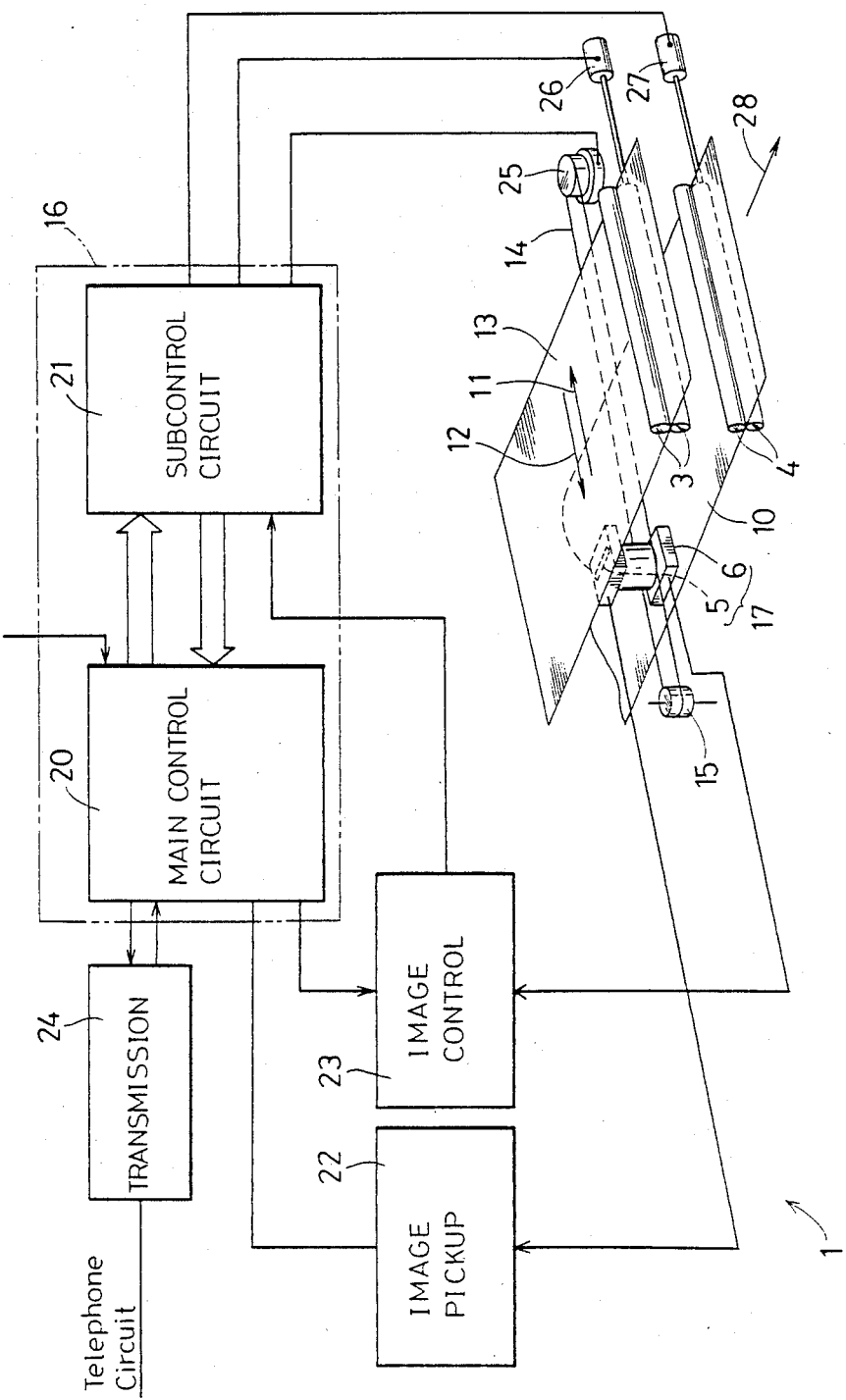
FIG. 1 is a block diagram schematically showing the construction of a facsimile apparatus embodying the invention.
Figure 2:
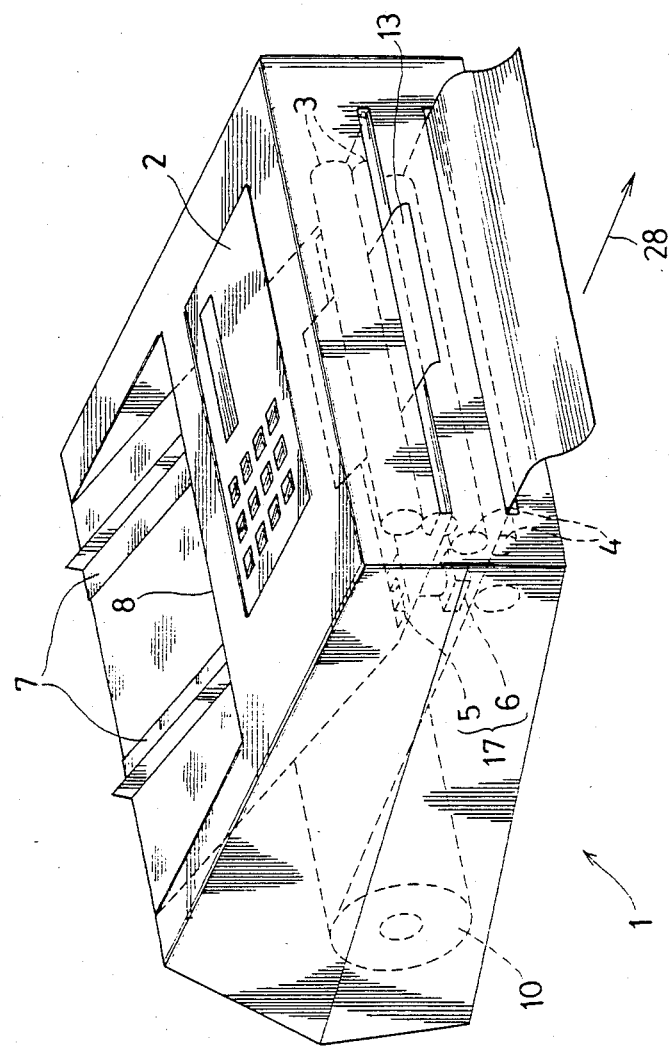
FIG. 2 is a perspective view showing the appearance of the facsimile apparatus.

FIG. 1 is a block diagram schematically showing the construction of a facsimile apparatus 1 of the serial type embodying the invention, and FIG. 2 is a perspective view showing the appearance of the facsimile apparatus.

The facsimile apparatus 1 comprises a stepping motor 25 and a movable unit 17 serving as a reading/writing head. The movable unit 17 includes a line sensor 5 employed parallel to the direction 28 of transport of a document 13 or recording paper 10, and a heating element 6 for thermal recording. A control unit 16 is divided into a main control circuit 20 for effecting control, for example, for data transmission, and a subcontrol circuit 21 for primarily controlling mechanical drive device.

When a button or similar device on an operation panel 2 of the apparatus 1 is depressed to read the document 13 and transmit the data read, the document 13 is scanned by the line sensor and read over a specified width (e.g. 16 mm) at every stroke. The output of the line sensor 5 is fed to the main control circuit 20 via an image pickup circuit 22. The main control circuit 20 transmits the data, for example, to a telephone circuit through a transmission circuit 24 for encoding or composing signals. At the same time, the main control circuit 20 feeds a synchronizing signal to the subcontrol circuit 21.

When signals are received from the telephone circuit or similar device for writing data on the recording paper 10, the signals received are delivered from the transmission circuit 24 to the main control circuit 20, which in turn feeds the signals to the heating element 6 via an image control circuit 23 to write the data on the paper 10. At this time, the image control circuit 23 feeds a synchronizing signal to the subcontrol circuit 21.

For the transport of the document 13 or the recording paper 10, the subcontrol circuit 21 controls a stepping motor 26 or 27 in response to the synchronizing signal from the main control circuit 20 or the image control circuit 23. The stepping motors 26 and 27 drive rollers 3 and 4, respectively, to transport the document 13 and the paper 10 in the direction of arrow 28.

With the facsimile apparatus 1 described, the movable unit 17 reads or writes the data while traveling from a reference position. The power of the stepping motor 25 is transmitted to the movable unit 17 by means of a wire 14 reeved around the motor 25 and a pulley 15, whereby the movable unit 17 is driven.

The subcontrol circuit 21 feeds a pulse signal to the stepping motor 25 to thereby drive the stepping motor 25. The movable unit 17 travels a given distance in response to one pulse delivered from the subcontrol circuit 21.

As shown in FIG. 2, the document 13 is inserted into the apparatus 1 through an inlet 8. Guides 7 are movable sidewise in conformity with the size of the document 13. A sensor (not shown), such as a microswitch, provided in connection with the guide 7 gives the main control circuit 20 a signal indicating the size of the document 13.

Thus recognizing the size of the document 13, the main control circuit 20 determines the speed of travel of the movable unit 17 in the direction of the arrow 12 according to the size and then feeds a signal representing the speed to the subcontrol circuit 21. The subcontrol circuit 21 controls the speed of rotation of the stepping motor 25 by varying the number of pulses to be given to the motor 25 per unit time and thereby vary the speed of travel of the movable unit 17 in the direction 12.

Figure 3:
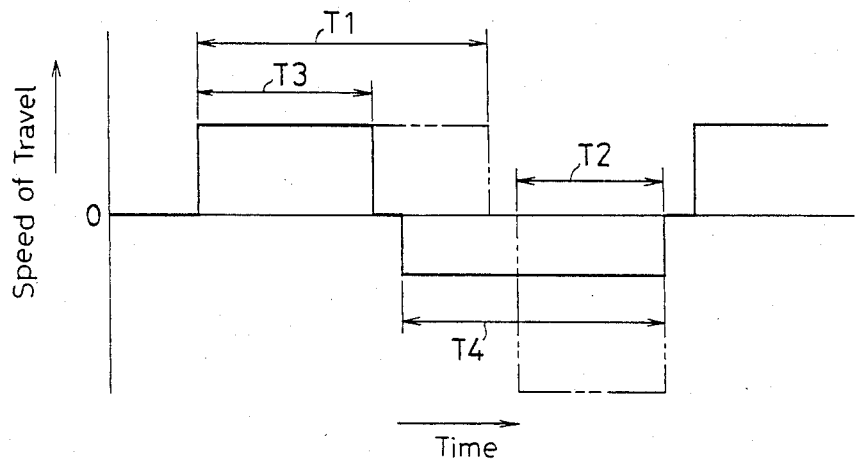
FIG. 3 is a diagram showing the relationship between the speed of travel of a movable unit in the facsimile apparatus.
Figure 4:
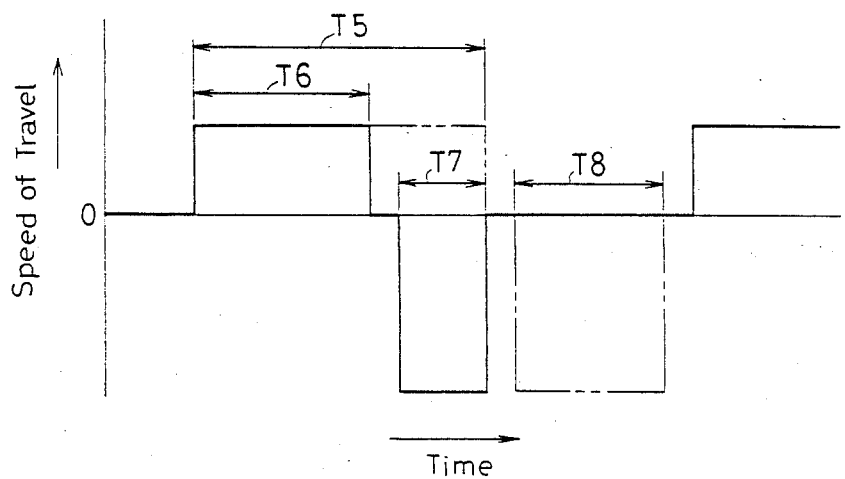
FIG. 4 is a diagram showing the relationship between the speed of travel of a movable unit in a conventional facsimile apparatus.

FIG. 3 is a diagram showing the relationship between the travel speed of the movable unit 17 and time during the reading operation of the facsimile apparatus 1. The operation will be described with reference to FIG. 3. The speed of the movable unit 17 for a document 13 of large size is indicated in a phantom line. For this document, the movable unit 17 starts to travel from the reference position toward the direction of arrow 11 in FIG. 1 with the start of a period T1, reads the document while traveling over the period T1 and stops upon traveling the dimension of the document Subsequently, the unit is driven in the direction of arrow 12 over a period of T2 to return to the reference position. Since the document size is large, the unit is unable to return to the reference position within the scanning time which is limited as already stated, unless the unit travels at a high speed in this situation. The above operation is repeated for the reading of the document 13.

The speed of the movable unit 17 for a document of small size is indicated in a solid line in FIG. 3. During a period T3, the unit 17 reads the document while traveling toward the direction of arrow 11. The unit thereafter travels at a low speed toward the direction of arrow 12 during a period of T4 to return to the reference position Since the speed of the return travel is low as illustrated in FIG. 3, there is little or no useless waiting time.

Thus, the movable unit 17 is driven at a low speed in the direction of arrow 12 when the apparatus 1 is used for documents of normal size and frequency, (those documents having a size smaller than the maximum size which can be handled by the apparatus). This serves to inhibit the mechanical noise emanating from the stepping motor 25 and the like, also inhibiting the impact noise otherwise produced when the unit is stopped abruptly at the reference position. Furthermore, the above feature shortens the rest period of the stepping motor 25, consequently improving the duty cycle of the motor to diminish the power consumption.

Although the reading operation of the above embodiment has been described, the writing operation thereof can be similarly controlled according to the invention. Upon receiving a signal from the telephone circuit of the like in this case, the main control circuit 20 feeds a synchronizing signal to the subcontrol circuit 21, which in turn causes the movable unit 17 to travel from the reference position toward the direction of arrow 11 for writing. At the same time, the main control circuit 20 detects from the received signal the distance the movable unit 17 is to be driven in the direction of arrow 11 and determines the speed of travel in the direction of arrow 12 in corresponding relation thereto in the same manner as above. The circuit 20 gives the subcontrol circuit 21 a signal representing the optimal speed. In this way the speed of return of the movable unit 17 is controlled for the writing operation.

Thus, according to the present invention, the speed of travel of the reading/writing head in a direction opposite to the reading or writing direction is determined according to the distance the head has traveled in the reading or writing direction so that the period of reciprocation of the head will be a specified value.

Consequently, the speed of travel is lowered when the reading or writing length is shortened, thus minimizing the running noise and impact noise on stopping. It is also possible to improve the performance of the motor for driving the head to assure reduced power consumption.

What is claimed is:

1. A reading or writing method for reading data from a medium or writing data thereon by reciprocatively driving a reading/writing head over the medium, the reading or writing method comprising:
   determining a reading or writing length of one line from the medium size or the writing data, respectively;
   driving the head forward at a predetermined speed independent of reading or writing length; and
   returning the head at a speed which is a predetermined maximum speed when the reading or writing length is at a maximum or at a speed lower than the maximum speed when the reading or writing length is shorter than the maximum so as to complete the reciprocation of the head within a substantially constant time period independent of the length of one line.

2. A method as defined in claim 1 wherein, when the reading or writing length is shorter than the maximum, the head is returned at a low speed, related to the reading or writing length so as to complete the reciprocation of the head with the same period as when the length is the maximum.

3. A reading or writing apparatus comprising:
   transport device for transporting a medium in a first direction,
   a head for reading data from the medium or writing data thereon,
   head drive means for reciprocatively driving the head over the medium in a second direction perpendicular to the first direction of transport of the medium,
   means for judging the scan length necessary for reading or writing a single line from the medium size or from the writing data respectively, and
   control means for controlling the transport means and the head drive means in synchronism to drive the head forward at a predetermined speed independent of the scan length and to return the head at a predetermined maximum speed when the reading or writing length determined by the judging means is at a maximum, or at a lower speed related to the scan length when the reading or writing scan length is shorter than the maximum so as to complete the reciprocation of the head within a substantially constant period regardless of scan length.

4. An apparatus as defined in claim 3 further comprising sensor means for detecting the size of the medium such as a microswitch.

5. An apparatus as defined in claim 3 wherein each of the transport means and the head drive means comprises a stepping motor.

6. An apparatus as defined in claim 3 which is a facsimile apparatus.

7. A reading or writing apparatus comprising:
   transport means for transporting a medium in a first direction,
   a head for reading data from the medium or writing data thereon,
   head drive means for reciprocatively driving the head over the medium in a second direction perpendicular to the first direction of transport of the medium,
   means for judging the scan length necessary for reading or writing a single line from the medium size or from the writing data respectively, and
   control means for controlling the transport means and the head drive means in synchronism to drive the head forward at a predetermined speed independent of the scan length, and to return the head at a predetermined maximum speed when the reading or writing scan length determined by the judging means is at a maximum and at a speed related to the reading or writing length when the reading or writing length is shorter than the maximum so as to complete the reciprocation of the head within a substantially constant period regardless of scan length.

8. An apparatus as defined in claim 7 further comprising sensor means for detecting the size of the medium such as a microswitch.

9. An apparatus as defined in claim 7 wherein each of the transport means and the head drive means comprises a stepping motor.

10. An apparatus as defined in claim 7 which is a facsimile apparatus.

11. A method of reciprocatively driving a reading/writing head over a medium to read data therefrom or write data thereon, said medium having a size which may vary, comprising: pog,21
    determining the length of a scan across said medium; said scan length being varied in response to medium size during reading or the write data during writing;
    driving said reading/writing head across said medium from an initial position at a predetermined constant scan rate over said scan length;
    returning said reading/writing head to said initial position at a return speed related to said scan length;
    said return speed being varied so that the time for driving at said predetermined constant scan rate and the time for driving at said return speed collectively equal a constant scan cycle period.

12. The method of driving of claim 11 wherein the return speed is varied in relationship to scan length to reduce the return speed for a scan smaller than a maximum scan, thereby, reducing noise caused by said step of returning.

* * * * *